United States Patent [19]
Cetrangolo

[11] Patent Number: 6,073,621
[45] Date of Patent: Jun. 13, 2000

[54] APPARATUS FOR AUTOMATIC LAYOUT AND CUTTING CORNER LINES IN STONE

[76] Inventor: Dolivio L. Cetrangolo, 12 Towne St., Montpelier, Vt. 05602

[21] Appl. No.: 09/054,669

[22] Filed: Apr. 3, 1998

Related U.S. Application Data

[60] Provisional application No. 60/056,441, Aug. 25, 1997.

[51] Int. Cl.[7] ...................................... B28D 1/02
[52] U.S. Cl. ........................... 125/12; 125/13.01; 125/35
[58] Field of Search .................................. 125/13.01, 12, 125/35; 83/522.11, 522.26, 640, 648, 436.7, 436.75, 39, 404.1, 404.2, 471.2, 471.3, 477.1, 76.1

[56] References Cited

U.S. PATENT DOCUMENTS

| | | | |
|---|---|---|---|
| 2,187,299 | 1/1940 | Burkhardt | 125/13 |
| 3,289,662 | 12/1966 | Garrison | 125/14 |
| 3,547,096 | 12/1970 | Ronzani | 125/13 |
| 3,815,570 | 6/1974 | Story | 125/14 |
| 4,131,103 | 12/1978 | Ishizuka | 125/13 R |
| 4,257,297 | 3/1981 | Nidbella | 83/471.3 |
| 4,484,417 | 11/1984 | Klingerman | 51/267 |
| 4,541,405 | 9/1985 | Schlough | 125/23 R |
| 4,660,539 | 4/1987 | Battaglia | 125/10 |
| 4,676,130 | 6/1987 | Nutt . | |
| 4,885,967 | 12/1989 | Bell et al. . | |
| 4,978,246 | 12/1990 | Quenzi et al. . | |
| 5,056,272 | 10/1991 | Battaglia | 51/283 R |
| 5,085,008 | 2/1992 | Jennings et al. . | |
| 5,285,708 | 2/1994 | Bosten et al. . | |
| 5,375,495 | 12/1994 | Bosten et al. . | |
| 5,675,899 | 10/1997 | Webb . | |

*Primary Examiner*—Timothy V. Eley
*Assistant Examiner*—Dung Van Nguyen
*Attorney, Agent, or Firm*—Donald S. Holland, Esq.; Holland & Bonzagni, P.C.

[57] ABSTRACT

An apparatus or machine is disclosed for automatic establishing and cutting the corner lines in a piece of stone. The machine includes two pairs of saw blades, each pair disposed on opposite sides of the stone. The saw blades are adjustable in two directions with respect to each other to properly locate the saw blades with respect to the four corners of the stone. Laser light sources are positioned to provide light beams down onto the piece of stone at the precise location of the outer edge of the saw blade. The laser light sources assist the machine operator in properly positioning the stone with respect to the saw blades. Once the stone is properly located, the saw blades are moved into cutting engagement with the stone. After the four corner lines of the stone have been cut, these corner lines precisely establish the dimensions of the rectangles on the top and bottom stone surfaces, and the four vertical corner lines connecting the two rectangles.

19 Claims, 4 Drawing Sheets

APPARATUS FOR AUTOMATIC LAYOUT AND CUTTING CORNER LINES IN STONE

RELATED APPLICATION

This application is based in part on U.S. Provisional Patent Application Ser. No. 60/056441, filed Aug. 25, 1997.

BACKGROUND OF THE INVENTION

This invention generally relates to an apparatus or machine for cutting stone, and more particularly to such an apparatus or machine which automatically establishes and cuts the corner lines in a piece of unfinished stone, wherein these corner lines are precisely positioned at the four corners of the finished piece of stone.

It is known in the art of stone cutting to utilize a hand measuring system to lay out or establish, in a piece of unfinished stone, the outer dimensions (i.e., length, width, thickness) of the finished stone. The finished stone may be the base stone for a graveyard headstone or monument, a bevel marker, a rock back slant marker or the headstone itself. Typically, the finished stone comprises a six-sided stone having smooth top and bottom rectangular surfaces that are parallel to each other, and four side or end surfaces that are perpendicular to both the top and bottom surfaces and to each other. The side surfaces are typically rough split to have a natural rock finish. The upright stone of a monument typically has one smooth side surface.

A common method of establishing the dimensions of the finished stone, in a larger piece of unfinished stone, is to lay out these dimensions by hand. Lines are measured and drawn in the finished stone. These lines represent the desired outer dimensions of the finished stone. The excess stone is then cut away, either by hand (e.g., with a hammer and chisel) or with a machine-operated saw. Hand-establishing the dimensions of the final piece of stone usually has involved establishing the two rectangular dimensions (i.e., length and width) on a top surface of the stone, and then transferring these dimensions through the four corner lines to the bottom rectangular stone surface. The stone is then cut along the lines to produce the finished stone.

More specifically, initially the desired position of the first long side of the rectangle on the top surface of the stone is visually established using a straightedge. Before finalizing the position of the straightedge on the top stone surface, it is necessary to check with a ruler that there is enough stone material to include the desired dimension of the second, opposite long side of the rectangle. The worker must also check that there does not exist excess stone, which necessitates moving the straightedge to "divide up" the stone to be removed. In this way, the most efficient use of the stone is made.

When the straightedge has been approximately located visually, a line is hand drawn along the straightedge, thereby establishing the first long side of the rectangle on the top stone surface. At each end of that line, measurements are made at ninety degree angles to the line. This establishes the correct width of the rectangle. The two measured locations are then marked and connected with a straightedge to establish the second long side of the rectangle on the top stone surface.

A similar hand measuring process is used to establish the two ends or short sides of the rectangle on the top stone surface. Instead of using a straightedge, a carpenter's square is typically used when marking these sides. This helps to ensure that the first end is perpendicular to the previously-marked two long sides of the rectangle. A ruler is used to determine the distance between the ends of the rectangle. After this distance has been marked, the carpenter's square is used to mark the short sides of the rectangle. The hand layout of the top stone surface is now complete. However, this process of hand measuring the top stone surface is somewhat tedious and time-consuming, and is prone to errors.

Nevertheless, once the rectangle on the top stone surface has been established, the next step is to establish the four vertical corner lines, starting at each corner of the rectangle on the top stone surface. The corner lines are typically established by removing the excess stone at the corners outside of the rectangle drawn on the top surface. Once the corner lines are established, they traverse the thickness of the stone and connect the top and bottom rectangular stone surfaces. Thus, the placement and straightness of these four vertical corner lines are crucial in accurately establishing the dimensions of the rectangle on the bottom stone surface.

This method of hand measuring the rectangles on the top and bottom stone surfaces, and the subsequent cutting away of the stone to form the corner lines, traditionally has required considerable time, effort and skill. For example, as the excess stone is trimmed away from the corners of the rectangles, the worker must frequently check the corner lines he is cutting to verify squareness with the top surface of the stone. This squareness is checked from both a long side and a short side of the rectangle using a carpenter's square. In this way, the worker can adjust the amount of stone removed. Unfortunately, the carpenter's square can fit properly on the stone only after all of the excess stone outside of each corner has been removed and the corner line has been located. The resulting corner line is rarely truly straight or square with the top and bottom stone surfaces.

Nevertheless, once the excess stone has been removed at the corner lines, the rectangle on the bottom stone surface is established by connecting adjacent vertical corner lines with a straightedge. However, the four lines defining the rectangle on the bottom surface of the stone are seldom truly parallel or perpendicular as required. This is due primarily to the cumulative errors in hand establishing the corner lines and the rectangles on the top and bottom stone surfaces.

Accordingly, it is a primary object of the present invention to provide an apparatus or machine that automatically establishes the exact size and position of the three-dimensional shape of a finished stone by accurately establishing the position of the four corner lines of the stone.

It is a general object of the present invention to establish the vertical corner lines that connect the top and bottom rectangular surfaces of a finished stone, wherein each vertical corner line is exactly square with its respective side surface, and wherein each vertical corner line is a straight line that defines the intersection of the planes of the corresponding adjacent sides of the stone.

It is another object of the present invention to facilitate and simplify the accurate location of each of the four corners of a finished stone.

Yet another object of the present invention is to significantly reduce the amount of effort, time and skill required to establish the dimensions of a finished stone.

Another object of the present invention is to accurately establish a rectangle on the top stone surface and transfer this rectangle to the bottom stone surface through the four corner lines.

Still another object of the present invention is to eliminate all steps of hand establishing any of the dimensions of a finished stone.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicant has invented an apparatus or machine that automatically locates and cuts the corner lines in a piece of stone.

In a preferred exemplary embodiment, the apparatus includes a conveyor which transports an unfinished piece of stone into position for cutting of the four corner lines. The conveyor includes means for holding the stone firmly in place during cutting. On each side of the conveyor is a moveable platform. Each platform is moved back and forth along rails by a corresponding hydraulic cylinder. One end of each cylinder is attached to the associated platform, while the other end of each cylinder is attached to a slide which moves along a spine. The spine is fixed between the rails and is parallel thereto. The slide is moved by a hydraulic cylinder, one end of which is attached to the slide, the other end is attached to the spine.

On the top surface of each platform is mounted a vertical beam. Each vertical beam has a slide that is moved up and down by a corresponding hydraulic cylinder. Mounted on each slide is a horizontal beam, and mounted on each horizontal beam are two separate horizontal slides. One slide in each pair of slides is moveable only slightly for purposes of calibration, whereas the other slide in each pair of slides is movable a relatively larger amount by a corresponding hydraulic cylinder.

On each horizontal slide is mounted an associated electric motor on whose output shaft is mounted a diamond-edged rotary saw blade used to cut stone. Disposed above the innermost edge of each saw blade is a laser light source that points light downward in a line toward the piece of stone. Each beam of laser light is adjustable to precisely lie along the cutting path of the saw blade.

In operation, the stone is moved along the conveyor until it is between the two platforms. The laser light beams, along with measuring rules, assist the machine operator in properly locating the saw blades with respect to the four corners of the stone. The hydraulic cylinders move the two platforms toward or away from each other, or in unison in the same direction, to align the saw blades properly at the four corners of the stone, one blade for each corner.

Once the saw blades are aligned (as indicated by the position of the laser light beams on the top surface of the stone at the four corners thereof), the vertical slides are operated by the corresponding hydraulic cylinders to move the saw blades downward to cut the stone at each corner. After the corners are cut, the saw blades are retracted upward to their home position. The four vertical corner lines cut into the stone are now precisely located. The stone can then be processed by farther stone cutting means apart from the machine of the present invention.

BRIEF DESCRIPTION OF THE DRAWINGS

FIGS. 3–6, including

DETAILED DESCRIPTION OF THE PREFERRED EMBODIMENTS

The apparatus or machine 100 of the present invention automatically locates and cuts the four corner lines 104 in a piece of unfinished stone 108. The machine 100 utilizes four saw blades 112, 116, 120, 124, one per corner of the stone 108. The saw blades 112, 116, 120, 124 are precisely located with respect to the four corners using various adjustable means. Each saw blade 112, 116, 120, 124 is accompanied by a laser light source 128, 132, 136, 140, that assists the machine operator in aligning the cutting edge of the saw blade 112, 116, 120, 124 with the corresponding corner of the stone 108. Once the saw blades 112, 116, 120, 124 are aligned, the blades cut the corner lines 104. Using the corner lines 104 as a guide, the stone 108 can then be cut to its final dimensions by other apparatus not a part of the machine 100 of the present invention.

FIGS. 1, 2, 7 and 8 are various views of a preferred exemplary embodiment of the machine 100 of the present invention. The machine 100 includes a conveyor 144 that transports the unfinished piece of stone 108 into an approximate position to be cut. The conveyor 144 has rollers 148 onto which the stone 108 is placed and moved. The conveyor 144 may include a means 152 for holding the stone 108 to prevent undesired movement of the stone during cutting. Alternatively, the holding means 152 may be located apart from the conveyor 144. In contrast, the stone 108 may be affixed to the conveyor 144 using one or more wedges that are manually put into position by the machine operator at various points along the edges of the stone 108. In this case, the wedges function as the holding means 152. Also, the conveyor 144 may be motorized to move the stone 108; else the machine operator may move the stone by hand along the conveyor 144.

However, it should be understood that the conveyor 144 is optional within the broadest scope of the present invention. Instead, other means for positioning the stone 108 may be utilized, such as a table. In the alternative, no means for positioning the stone 108 may be employed. It suffices for the broadest scope of the present invention that the stone 108 be placed into an approximate position with respect to the machine 100. As described in detail hereinafter, the machine 100 includes means for moving the saw blades 112, 116, 120, 124 into precise position with respect to the stone 108.

The machine 100 also includes two separate moveable platforms 156, 160, similar in structure, disposed on opposite sides of the conveyor 144. Each platform 156, 160 includes a base plate 164 moveable back and forth (as indicated by the arrowheads in FIG. 1) along an axis perpendicular to the movement of the stone 108 on the conveyor 144. Each base plate 164 is moved along one or more rails 168 by an associated hydraulic cylinder 172,176. One end of each cylinder 172,176 is connected to the corresponding platform 156,160, while the other end is connected to a slide 180 which moves along a spine 184. The spine 184 is fixed between the rails 168 of each platform 156,160. The slide 180 is moved back and forth along the spine 184 and along the same axis as the platforms 156,160 by a hydraulic cylinder 188. One end of the cylinder 188 is attached to the slide 180, while the other end is attached to the spine 184.

Figures 1, 2:
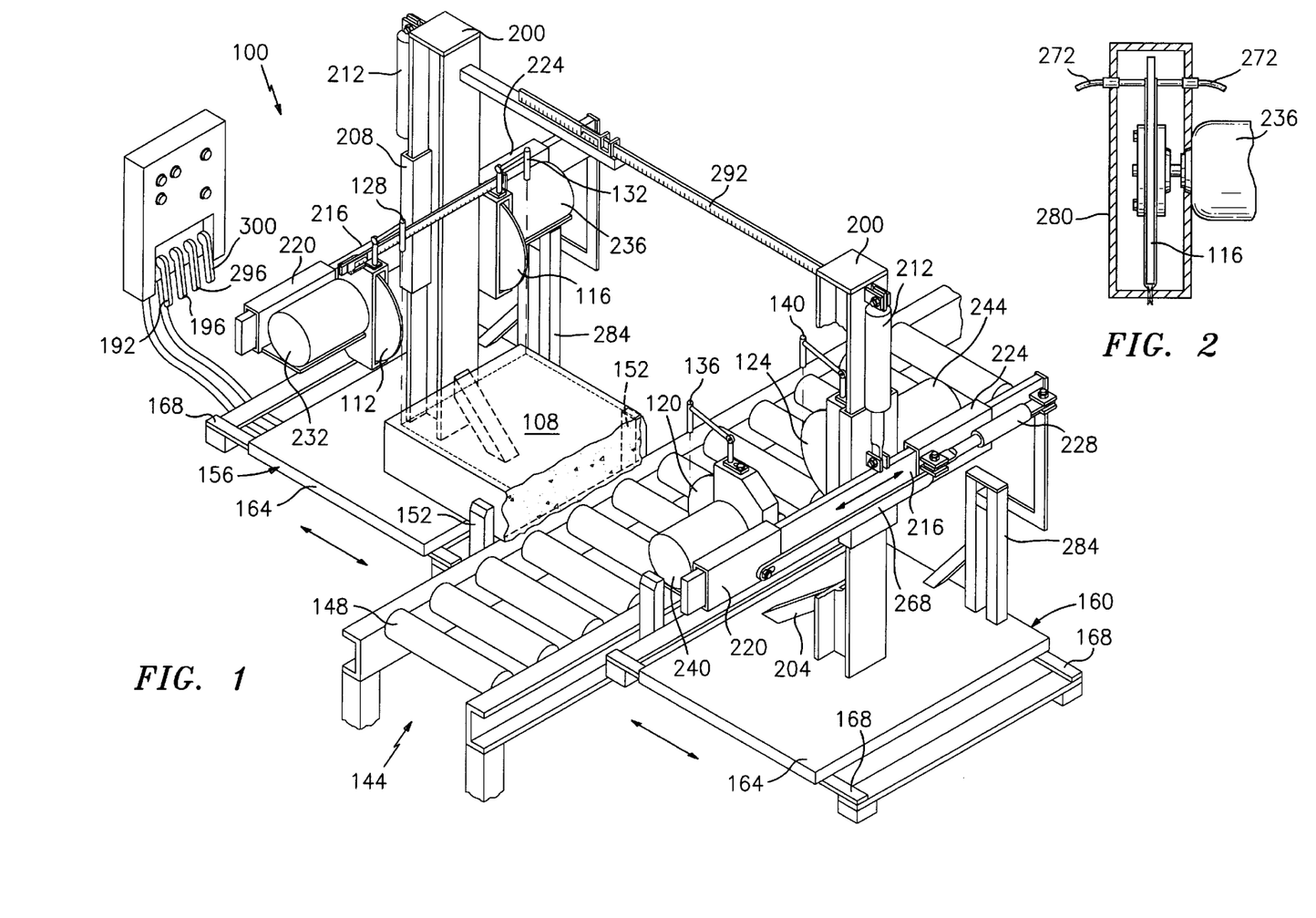
FIG. 1 is a perspective view of the stone cutting machine of the present invention, a portion shown in phantom, and also partially illustrating a piece of stone to be cut by the machine.
FIG. 2 is a detailed side view of a portion of a motor and a corresponding saw blade, together with a portion of a water coolant system used to cool the saw blade during the stone cutting operation, all of which are a part of the machine of FIG. 1.

The two hydraulic cylinders 172,176 that move the platforms 156,160 are controlled by a first lever 192. The lever 192 is one of a plurality of hand-operated levers mounted adjacent the platforms 156,160 and within reach of the machine operator. The first lever 192 is connected by hydraulic lines to the two hydraulic cylinders 172,176 such that when the machine operator moves the lever 192 in a first direction, the two platforms 156,160 move simultaneously toward each other. On the other hand, when the machine operator moves the lever 192 in the opposite direction, the two platforms 156,160 move simultaneously away from each other. Thus, the hydraulic cylinders 172,176 control the distance between the platforms.

A third lever 296 controls the hydraulic cylinder 188 connected between the slide 180 and spine 184 such that when the machine operator moves the lever 296 in a first direction, the slide 180 moves both platforms 156,160 simultaneously in one direction. Conversely, when the machine operator moves the third lever 296 in the opposite direction, the slide 180 moves both platforms 156,160 simultaneously in the opposite direction. Thus, the hydraulic cylinder 188 connected to the slide 180 controls the lateral position of the platforms 156,160 with respect to the stone 108, while keeping the distance between the two platforms constant.

Mounted on the top surface of the base plate 164 of each platform 156,160 is a vertical beam 200 that is perpendicular to the platform top surface. Each vertical beam 200 includes one or more cross braces or tubular stiffeners 204, connected between the beam 200 and corresponding base plate 164. The braces 204 prevent the vertical beams 200 from deflecting undesirably during the stone cutting process.

Mounted on each beam 200 is a vertical slide 208. Each slide 208 is moved up and down the corresponding beam 200 by an associated hydraulic cylinder 212. One end of the cylinder 212 is attached to the beam 200, while the other end is attached to the corresponding vertical slide 208. On each vertical slide 208 is mounted a beam 216. Each beam 216 is mounted both horizontally with respect to the associated vertical beam 200 and perpendicular to the base rails 168.

Mounted on each horizontal beam 216 is a pair of horizontal slides 220,224, one horizontal slide on each side of the vertical slide 208. One slide 220 in the pair of slides 220,224 is "fixed" in that it is moveable only slightly for purposes of location calibration. The other slide 224 in the pair of slides 220,224 is moveable a relatively large amount by a corresponding hydraulic cylinder 228. One end of each hydraulic cylinder 228 is mounted to the associated horizontal beam 216, while the other end is mounted to the corresponding "moveable" horizontal slide 224.

On each of the four horizontal slides is mounted an electric motor 232, 236, 240, 244. Two motors 232,236 are mounted on the pair of horizontal slides 220,224 located on the horizontal beam 216 affiliated with a first platform 156. Two other motors 240,244 are mounted on the pair of horizontal slides 220,224 located on the horizontal beam 216 affiliated with the second platform 160. Each pair of electric motors 232, 236, 240, 244 has their corresponding motor shafts aligned coaxial with one another. On each motor shaft is mounted a diamond-edged saw blade 112, 116, 120, 124 that cuts the corner lines 104 in the stone 108, as described in detail hereinafter.

Each of the four motors 232, 236, 240, 244 is mounted to its corresponding horizontal slide 220,224 by an adjustable base or mount 264. The mount 264 is moveable horizontally, thereby allowing for corresponding horizontal movement of the motors 232, 236, 240, 244. This allows the motors 232–244 to be moved independently of one another to compensate for different rates of blade wear over time. Since two of the motors 232,240 are mounted to corresponding horizontal slides 220 that are relatively fixed in position, those slides 220 are equipped with couplings 268. The couplings 268 can be designed to allow the corresponding fixed horizontal slide 220 to be releasably detached from the associated moveable horizontal slide 224 in the pair of slides 220,224 on each vertical beam 200. Each coupling 268 would thereby allow the fixed motor 232,240 to be moved relatively easily and quickly when it is desired, for example, to change the blade 112,120. This can be accomplished without losing the previously-attained calibration of the fixed motors 232,240.

Each saw blade 112, 116, 120, 124 has an associated water coolant system operable during the stone cutting process. The coolant system for each blade comprises a pair of hoses 272. One end of each hose 272 is disposed in a water coolant system (not shown), while the other end of each hose 272 is disposed in close proximity to the surface of the corresponding saw blade 112, 116, 120, 124 adjacent the outer cutting edge of the saw blade. For each saw blade, one hose 272 is on one side of the blade, while a second hose 272 is on the opposite side of the blade. While the saw blades 112, 116, 120, 124 are spinning during the cutting operation, each hose 272 directs the water onto the blade. The water is moved by centrifugal force toward the outer cutting edge of the saw blade where it cools the blade edge.

The machine 100 of the present invention also includes four laser light sources 128, 132, 136, 140, one for each saw blade 112–124. Each laser light source 128–140 is disposed above the innermost edge of each saw blade such that the laser light beam is directed downward in a line toward the corresponding platform base plate 164. The laser light source 128, 132, 136, 140 generates a beam of light that assists the machine operator in properly locating the stone 108 on the conveyor 144 for the subsequent cutting operation. When the stone 108 is properly oriented for cutting, each of the four laser light beams is oriented on the top surface of the stone 108 at a corresponding corner thereof.

Each laser light source 128, 132, 136, 140 includes an adjustable mounting plate 276, attached to the corresponding saw blade guard 280. The adjustable laser light mount 276 allows the laser beam to be accurately aligned with the outer edge of the saw blade 112, 116, 120, 124 as that outer edge of the blade wears down during the stone cutting process. The adjustable laser light mount 276 can either be moved manually or automatically.

At each end of the two horizontal beams 216 is an outrigger 284 that connects the beam 216 to the corresponding platform base plate 164. The outriggers 284 stabilize both the horizontal beams 216 and the vertical beams 200, thereby preventing any undesired twisting of those beams that could cause inaccuracies in the cuts made in the stone 108.

The machine 100 also includes two separate distance-measuring rules 288,292. One rule 288 assists the machine operator in visually determining the distance between the pair of saw blades 112,116 on one vertical beam 200. This distance corresponds to the width of the stone 108. A second rule 292 assists the operator in visually determining the distance between the saw blades 112,116 on one vertical beam 200 with respect to the saw blades 120,124 on the other vertical beam 200. This distance corresponds to the length of the stone 108.

The first rule 288 has one end affixed to the "moveable" horizontal slide 224 disposed on one side of one of the vertical beams 200, while a pointer is affixed to the "fixed" horizontal slide 220 on the opposing side of the same vertical beam 200. The machine operator takes a direct read of the distance between the two saw blades 112,116 mounted on that vertical beam 200. This distance corresponds to the width dimension of the rectangle on the top surface of the stone 108.

However, since these two saw blades 112,116 are moved simultaneously in the same amount and direction as the other two saw blades 120,124, the other two saw blades 120,124 do not require a separate metal rule to facilitate the determination of the distance between those blades. Instead, it is assumed that the proper positioning of the two saw blades 112,116 associated with the vertical beam 200 having the rule 288 results in the corresponding appropriate positioning of the other two saw blades 120,124 associated with the other vertical beam 200.

Specifically, a second lever 196 and corresponding hydraulic lines (not shown) are provided such that when the lever 196 is moved by the machine operator in one direction, both hydraulic cylinders 228 associated with the moveable horizontal slides 224 are simultaneously moved in the same direction. On the other hand, when the lever 196 is moved by the machine operator in the opposite direction, both hydraulic cylinders 228 associated with the moveable horizontal slides 224 are simultaneously moved in the opposite direction.

The second rule 292 is affixed at one end to one of the vertical beams 200, while a pointer is affixed to the other vertical beam 200. The rule 292 allows the machine operator to obtain a direct read of the distance between a pair of saw blades 112,116 on one vertical beam 200 and the other pair of saw blades 120,124 on the other vertical beam 200. This distance corresponds to the length dimension of the rectangle on the top surface of the stone 108.

In the operation of the machine 100 of the present invention, the operator places an unfinished piece of stone 108 on top of the conveyor 144 and moves the stone 108 into an approximate cutting position between the two platforms 156,160. The conveyor 144 runs parallel to the floor of the working area in which the machine 100 is located. Generally, the conveyor 144 is supported by the floor and does not interfere with the platforms 156,160.

After the stone 108 is positioned, the operator adjusts the position of the saw blades 112, 116, 120, 124 for precise cutting of the four vertical corners lines 104. The operator adjusts the distance between the platforms 156,160 using the first lever 192, with the assistance of the second rule 292. This distance corresponds to the desired length of the rectangle on the top stone surface. The operator also adjusts the distance between each pair of saw blades 112, 116, 120, 124 using the second lever 196. This distance corresponds to the desired width of the rectangle on the top stone surface.

Once the length and the width of the rectangle are established, the operator checks that each of the four laser light sources 128, 132, 136, 140 projects its light beam onto the top surface of the stone 108 at the proper location in the corner of the stone. If the stone 108 is not located properly with respect to the laser light sources 128–140, the operator uses the third lever 296 to simultaneously move the two platforms 156,160 in either one of two directions. The two platforms 156,160 are moved in unison in either of two directions without affecting the previously-set distance between them.

After the saw blades 112, 116, 120, 124 are properly located, the machine 100 is ready to cut the four corner lines 104 into the stone 108. The operator begins the cutting process by moving a fourth lever 300 which actuates the hydraulic cylinders 212 associated with the vertical slides 208. The operator moves the fourth lever 300 in one direction to simultaneously move all four saw blades 112, 116, 120, 124 downward into cutting engagement with the stone 108. Once the blades have cut completely through the stone 108, the operator reverses the direction of the fourth lever 300 to move the blades upward to their home position.

Figure 3A:
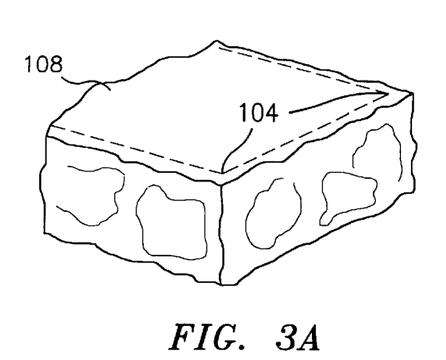
FIGS. 3a–3b, 4a–4b, 5a–5b and 6a–6b, illustrate various perspective and top plan views, respectively in each pair of figures, of a portion of piece of stone prior to and subsequent to the cutting of the corner lines using the machine of FIG. 1, and also after further stone cutting by apparatus that is not a part of the present invention.
Figure 3B:
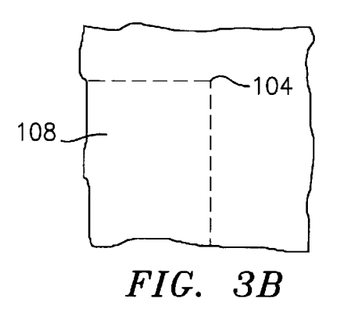

The machine 100 of the present invention precisely establishes the four vertical corner lines 104 in the stone 108, thereby connecting the rectangle on the top stone surface with the rectangle on the bottom stone surface. FIGS. 3a–3b illustrate the stone 108 prior to the cutting of the four vertical corner lines 104. The desired dimensions of the finished stone are illustrated by the dotted lines on the top stone surface.

Figure 4A:
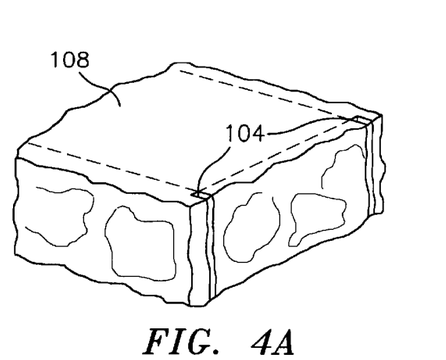
Figure 4B:
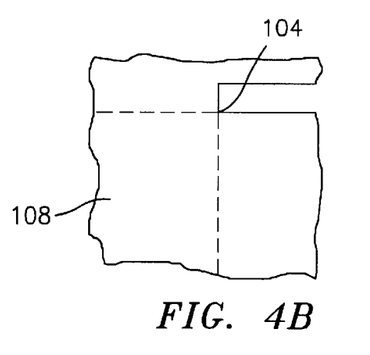

FIGS. 4a–4b illustrate the corner lines 104 cut into an end of the rectangular-shaped stone 108 by the machine 100 of the present invention. Each vertical corner line 104 is represented by the inner edge of each of the four saw cuts. Due to the precise nature of the establishment and cutting of these four vertical corner lines 104 by the machine 100 of the present invention, all four vertical lines are in an exact geometrical relationship to each other.

At this point in the stone cutting process, no additional hand measuring is required. Instead, the worker simply places a straightedge on the top surface of the stone 108 between any two adjacent vertical corner lines 104 and trims away excess stone material, typically by hand (e.g., with a hammer and chisel). By trimming away the excess stone material, the worker will ensure that the finished piece of stone 108 has perfectly parallel sides and square ends, both top and bottom.

Figure 5A:
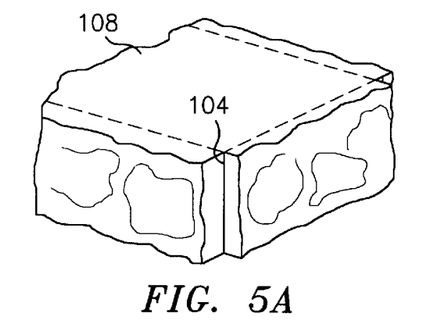
Figure 5B:
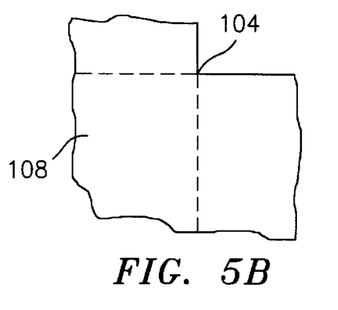
Figure 6A:
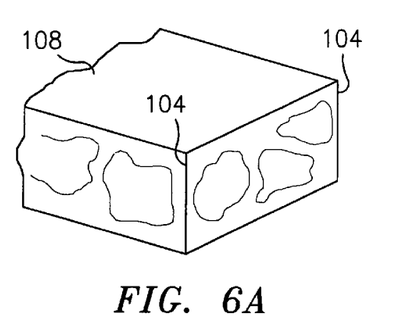
Figure 6B:
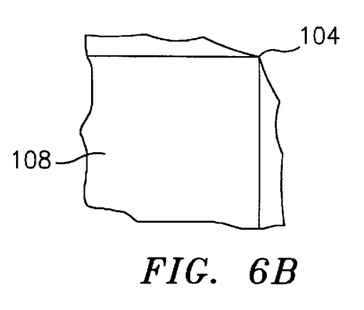
Figure 7:
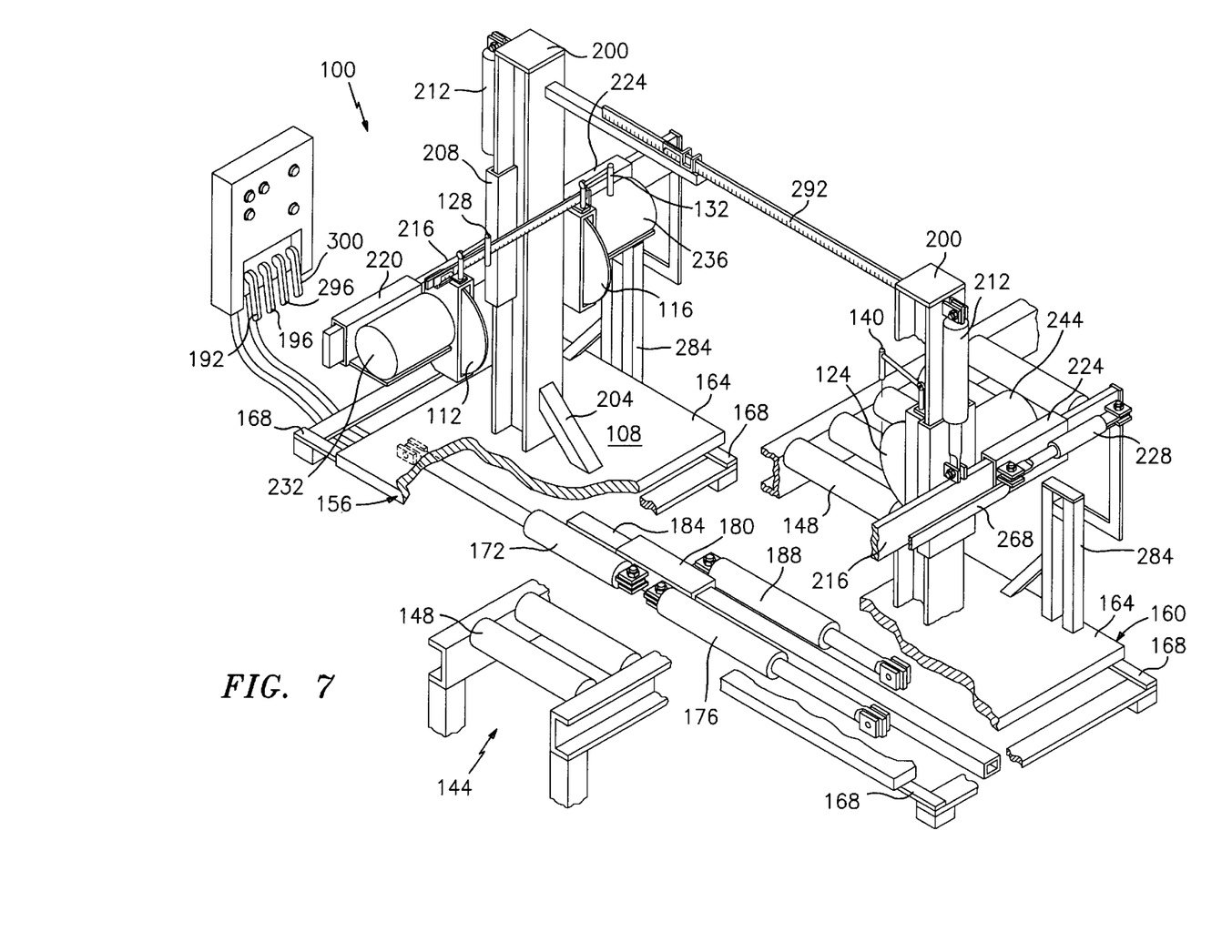
FIG. 7 is a perspective view, partially cut away, of a portion of the stone cutting machine of FIG. 1.
Figure 8:
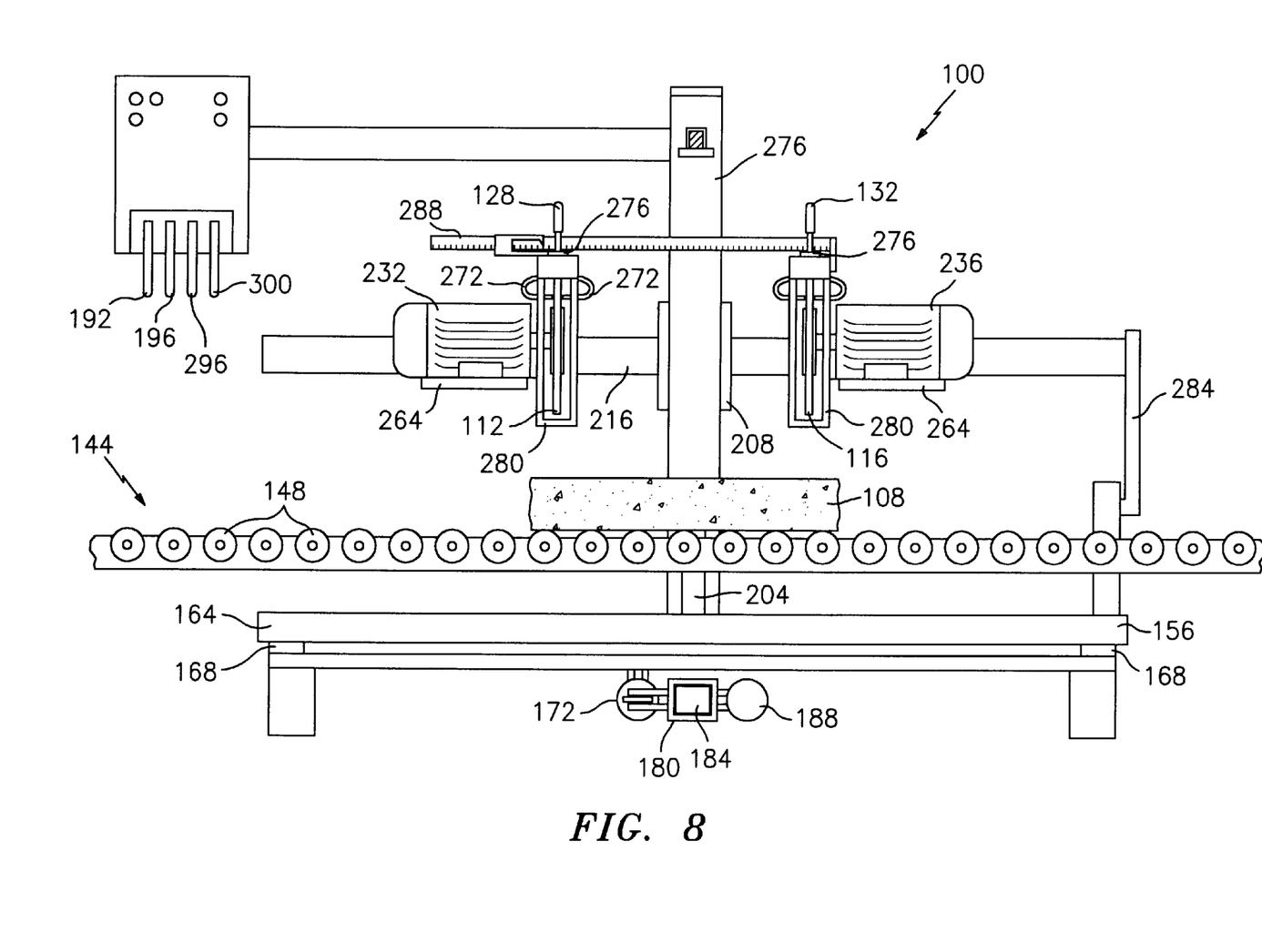
FIG. 8 is a side view of a portion of the stone cutting machine of FIG. 1.

When removing the excess stone material, the worker generally begins at the saw cuts made by the machine 100 of the present invention. When the excess stone has been removed from the vicinity of the vertical corner lines 104 (from the edge of the cut as well as the side of the cut), what remains is a perfectly straight vertical corner line that is in exact alignment with all of the stone surfaces. See FIGS. 5a–5b. The result is rectangles on the top and bottom stone surfaces that are in perfect parallel alignment to one another and connected by four vertical corner lines that are perfectly straight, square, and parallel with each other. See FIGS. 6a–6b.

The machine 100 of the present invention has been described for use in cutting the four corner lines 104 in an unfinished piece of stone 108. The stone may ultimately be used, for example, as the base or support stone for a graveyard headstone or monument. However, the machine 100 of the present invention may also be used to cut the corner lines in the headstone itself. Headstones are different from the base stone in that one side surface of the headstone has a smooth as opposed to a natural rough surface. This smooth surface, known as the joint, will ultimately be in contact with the top smooth surface of the base stone when the headstone is assembled with the base.

The machine 100 of the present invention may be used to cut the vertical corner lines 104 in the headstone. The headstone joint is the leading edge of the stone as it is placed onto the conveyor 144. The headstone lies flat on the conveyor rollers 148 and is moved along the conveyor 144 until it engages the holding means 152. The primary difference between the cutting of the headstone and cutting of the base stone is that only two vertical corner lines are required to be cut into the headstone by the machine 100. No vertical corner lines are required to be cut into the joint. Instead, only the end surface opposite the joint must have vertical lines cut there into. Consequently, only two of the saw blades 116,124 are used to cut these corner lines 104.

Similar to the cutting of the base stone 108 previously described, the distance between the two saw blades 116,124 is established by moving the platforms 156,160, assisted by the laser light sources 132,140 and measuring rules 288,292. The height of the monument is represented by the distance between the alignment stops 152 on the conveyor 144 and the position of the two opposing saw blades 116,124. Because the two opposing saw blades 116,124 move parallel to the conveyor 144, a direct read of the height of the monument is easily accomplished by utilizing a third measuring rule (not shown) calibrated to the conveyor stops 152. This additional rule may be located alongside the rule 288 previously described in establishing the width of the base stone 108.

After the two cuts are made in the headstone, the worker utilizes a square rather than a straightedge from the joint to each cut, to thereby establish the ends of the monument. To establish the top of the monument, a pattern, usually serpentine, is used to connect the two cuts. The headstone may then be processed by apparatus not a part of the present invention.

The machine 100 of the present invention has been described and illustrated herein as utilizing two separate platforms 156,160 that are moveable by various hydraulic and mechanical means. However, it should be understood that this is purely exemplary. Other means besides the hydraulic cylinders 172,176,188, the slide 180 and the spine 184 may be utilized for moving the platforms. For example, the platforms 156,160 may be moved by a screw-driven motor arrangement. Other structural means for moving the platforms should be obvious to one of ordinary skill in the art in light of the teachings herein.

Also, it is to be understood that the configuration of the individual components of the platforms 156,160 themselves, described and illustrated herein, are purely exemplary. For example, the vertical beams 200, vertical slides 208, hydraulic cylinders 212, horizontal beams 216, horizontal slides 220,224 and other platform components, are purely exemplary. The structural arrangement for supporting the motors 232, 236, 240, 244 and saw blades 112, 116, 120, 124 may take on other arrangements that should be obvious to one of ordinary skill in the art in light of the teachings herein.

Still further, the machine 100 of the present invention was described and illustrated herein as comprising two platforms 156,160. However, a single platform and corresponding means for supporting and moving one or more motors and saw blades is contemplated by the broadest scope of the machine 100 of the present invention. Depending upon the design of the single platform, the single platform may require the cutting of the corner lines 104 to be performed in more than one step. This would be the case if the platform was designed to support saw blades that could only cut one side of the stone at a time. However, it is possible to utilize a single platform having the saw blades arranged such that all four vertical corner lines 104 may be able to be cut simultaneously at once.

It should be understood by those skilled in the art that other, additional obvious structural modifications may be made, in light of the teachings herein, without departing from the broadest scope of the invention. Accordingly, reference should be made primarily to the accompanying claims, rather than the foregoing specification, to determine the scope of the invention.

Having thus described the invention, what is claimed is:
What is claimed is:

1. A method for cutting corner lines in a stone, comprising the steps of:

approximately positioning a stone in between two moveable platforms, each platform containing a pair of rotatable saw blades;

adjusting a distance between the two moveable platforms to correspond to a first dimension of the stone;

adjusting a distance between the pair of rotatable saw blades on each one of the moveable platforms to correspond to a second dimension of the stone;

utilizing a light beam for each saw blade to indicate an alignment of the corresponding saw blade with a location on the stone at which a corner line is to be cut; and moving each of the saw blades into cutting engagement with the stone to thereby cut the corresponding corner lines in the stone.

2. The method of claim 1, further comprising the steps of:

utilizing a measuring rule to assist in the step of adjusting the distance between the two moveable platforms to correspond to the first dimension of the stone; and utilizing a measuring rule to assist in the step of adjusting the distance between the pair of rotatable saw blades to correspond to the second dimension of the stone.

3. The method of claim 2, after the steps of adjusting a distance between the two moveable platforms to correspond to a first dimension of the stone and adjusting a distance between the pair of rotatable saw blades on each one of the moveable platforms to correspond to a second dimension of the stone, further comprising the step of adjusting the moveable platforms into a precise position with respect to the stone by moving the platforms in unison in either one of two directions.

4. An apparatus for cutting corner lines in a stone, comprising:

at least one moveable platform;

at least two stone cutting means mounted to the at least one moveable platform, each one of the at least two stone cutting means comprising means for making a saw cut in the stone at a predetermined location in the stone, wherein each saw cut represents a corner line in the stone;

moving means for moving each one of the at least one moveable platform into a predetermined position with respect to the stone prior to the cutting of the corner lines in the stone;

assisting means for assisting with a positioning of the at least one moveable platform, wherein the assisting means comprises a light source for assisting in a visual determination of the predetermined position of each one of the at least two stone cutting means with respect to the stone; and conveyor means for moveably positioning the stone with respect to each one of the at least one moveable platform.

5. The apparatus of claim 4, wherein the conveyor means further includes holding means for holding the stone in a fixed position with respect to the conveyor means, whereby there is no undesirable movement of the stone during cutting of the stone by the at least two stone cutting means.

6. An apparatus for cutting corner lines in a stone, comprising:

at least one moveable platform;

at least two stone cutting means mounted to the at least one moveable platform, each one of the at least two stone cutting means comprising means for making a saw cut in the stone at a predetermined location in the stone, wherein each saw cut represents a corner line in the stone;

moving means for moving each one of the at least one moveable platform into a predetermined position with respect to the stone prior to the cutting of the corner lines in the stone;

assisting means for assisting with a positioning of the at least one moveable platform via a visual determination of the predetermined position of each one of the at least two stone cutting means with respect to the stone; and holding means for holding the stone in a fixed position so that there is no undesirable movement of the stone during cutting of the stone by the at least two stone cutting means.

7. The apparatus of claim 6, wherein each one of the at least two stone cutting means comprises a saw blade axially connected to a motor for being rotatably driven thereby.

8. The apparatus of claim 7, wherein the motor includes an adjustable mounting means for allowing for movement of the motor into a desired position.

9. The apparatus of claim 6, wherein the assisting means comprises a light source for each one of the at least two stone cutting means, each light source providing a light beam in an aligned position with respect to the corresponding one of the at least two stone cutting means, wherein the light beams are provided by the light sources in a direction toward a position of the stone with respect to each one of the at least two stone cutting means, wherein the light beams provide a visual indication of the accuracy of alignment of the corresponding one of the at least two stone cutting means with respect to a corner of the stone.

10. The apparatus of claim 9, wherein the light source includes an adjustable mounting means for allowing for movement of the light source into a desired position.

11. The apparatus of claim 6, wherein the assisting means comprises measuring means for measuring a distance between a corresponding two of the at least two stone cutting means, and for providing a visual indication of the measured distance.

12. The apparatus of claim 6, further comprising means for moving each one of the at least two stone cutting means into cutting engagement with the stone.

13. An apparatus for cutting corner lines in a stone, comprising:

two moveable platforms, with a first moveable platform in the pair of platforms being disposed on a first side of the stone and a second moveable platform in the pair of platforms being disposed on a second side of the stone;

at least two stone cutting means mounted to each of the two moveable platforms, each one of the at least two stone cutting means comprising means for making a saw cut in the stone at a predetermined location in the stone, wherein each saw cut represents a corner line in the stone;

moving means for moving each one of the two moveable platforms into a predetermined position with respect to the stone prior to the cutting of the corner lines in the stone, the moving means comprising means, responsive to a first one of a plurality of platform position signals, for moving the first and second moveable platforms toward each other, wherein the moving means comprises means, responsive to a second one of a plurality of platform position signals, for moving the first and second moveable platforms away from each other, and wherein the moving means comprises means, responsive to a third one of a plurality of platform position signals, for moving the first and second moveable platforms while keeping constant the distance between the first and second moveable platforms; and assisting means for assisting with a positioning of the moveable platforms via a visual determination of the predetermined position of each one of the stone cutting means with respect to the stone.

14. The apparatus of claim 13, wherein each moveable platform in the pair of moveable platforms includes a pair of stone cutting means within the at least two stone cutting means, each moveable platform including means for moving the pair of stone cutting means, the means for moving the pair of stone cutting means being responsive to a first signal for moving the pair of stone cutting means towards each other, and the means for moving the pair of stone cutting means being responsive to a second signal for moving the pair of stone cutting means away from each other.

15. The apparatus of claim 14, wherein the assisting means comprises measuring means for measuring a distance between the pair of stone cutting means on at least one of the pair of moveable platforms, and for providing a visual indication of the measured distance.

16. The apparatus of claim 14, wherein the assisting means comprises measuring means for measuring a distance between a pair of stone cutting means on a first one of the pair of moveable platforms and a pair of stone cutting means on a second one of the pair of moveable platforms, and for providing a visual indication of the measured distance.

17. An apparatus for cutting corner lines in a stone, comprising:

at least one moveable platform;

at least two stone cutting means mounted to the at least one moveable platform, each one of the at least two stone cutting means comprising means for making a saw cut in the stone at a predetermined location in the stone, wherein each saw cut represents a corner line in the stone;

moving means for moving each one of the at least one moveable platforms into a predetermined position with respect to the stone prior to the cutting of the corner lines in the stone, the moving means comprising hydraulic means, responsive to at least two platform position signals, for moving each one of the at least one moveable platforms into the predetermined position with respect to the stone prior to the cutting of the corner lines in the stone, the hydraulic means being responsive to a first one of the at least two platform position signals for moving each one of the at least one moveable platforms toward the stone, the hydraulic means being responsive to a second one of the at least two platform position signals for moving each one of the at least one moveable platforms away from the stone; and assisting means for assisting with a positioning of the at least one moveable platform via a visual determination of the predetermined position of each one of the at least two stone cutting means with respect to the stone.

18. An apparatus for cutting a corner line in a stone, comprising:

a moveable platform;

stone cutting means mounted to the moveable platform, the stone cutting means comprising means for making a cut in the stone at a predetermined location in the stone, wherein the cut represents a corner line in the stone;

moving means for moving the moveable platform into a predetermined position with respect to the stone prior to cutting the corner line in the stone;

assisting means for assisting with a positioning of the moveable platform via a visual determination of the predetermined position of the stone cutting means with respect to the stone; and holding means for holding the stone in a fixed position so that there is no undesirable movement of the stone during cutting of the stone by the stone cutting means.

19. The apparatus of claim 18, wherein the assisting means comprises a light source, the light source providing a light beam in an aligned position with respect to the stone cutting means, wherein the light beam is provided by the light source in a direction toward a position of the stone with respect to the stone cutting means, wherein the light beam provides a visual indication of the accuracy of alignment of the stone cutting means with respect to a corner of the stone.

* * * * *

UNITED STATES PATENT AND TRADEMARK OFFICE
CERTIFICATE OF CORRECTION

PATENT NO. : 6,073,621
DATED : June 13, 2000
INVENTOR(S) : Dolivio L. Cetrangolo It is certified that error appears in the above-identified patent and that said Letters Patent is hereby corrected as shown below:

Column 3,
Line 58, change "farther" to -- further --.

Column 6,
Line 11, change "232-244" to -- 232, 236, 240, 244 --.
Line 41, change "112-124" to -- 112, 116, 120, 124 --.
Line 41, change "128-140" to -- 128, 132, 136, 140 --.

Column 8,
Line 3, change "128-140" to -- 128, 132, 136, 140 --.

Column 9,
Line 19, insert "." after "288,292".

Column 10,
Line 16, delete "What is claimed is:".

Column 11,
Line 39, change "alight" to -- a light --.

Signed and Sealed this

Thirty-first Day of July, 2001

*Attest:*

*Attesting Officer*

NICHOLAS P. GODICI
*Acting Director of the United States Patent and Trademark Office*